United States Patent [19]

Arai

[11] Patent Number: 4,811,037
[45] Date of Patent: Mar. 7, 1989

[54] IMAGE PROCESSING APPARATUS

[75] Inventor: Hitoshi Arai, Yokohama, Japan

[73] Assignee: Canon Kabushiki Kaisha, Tokyo, Japan

[21] Appl. No.: 224,255

[22] Filed: Jul. 26, 1988

Related U.S. Application Data

[63] Continuation of Ser. No. 900,998, Aug. 27, 1986, abandoned.

[30] Foreign Application Priority Data

Aug. 29, 1985 [JP] Japan .................. 60-188399

[51] Int. Cl.$^4$ ............................. G01D 9/42
[52] U.S. Cl. ...................... 346/108; 346/76 L; 358/280; 358/296; 358/298
[58] Field of Search .......... 346/108, 76 L, 107 A; 358/296, 298, 264, 265, 280, 306, 257; 372/26 T

[56] References Cited

U.S. PATENT DOCUMENTS 3,614,307 10/1971 Sasabe et al. .

FOREIGN PATENT DOCUMENTS

| 0050425 | 4/1982 | European Pat. Off. . | |
|---|---|---|---|
| 53-33533 | 3/1978 | Japan | 346/108 |
| 57-65060 | 4/1982 | Japan | 358/296 |
| 60-48664 | 3/1985 | Japan | 358/296 |
| 2132052 | 6/1984 | United Kingdom . | |

Primary Examiner—E. A. Goldberg
Assistant Examiner—Huan H. Tran
Attorney, Agent, or Firm—Fitzpatrick, Cella, Harper & Scinto

[57] ABSTRACT

An image processing apparatus has a semiconductor laser for modulating a light beam, a beam detector for detecting the beam, a selector for selecting an output from a digital data input unit or a black signal generator circuit, a comparator for pulse-width modulating an output from the selector received through a D/A converter, and a video enable (VE) signal generator circuit for generating a VE signal for switching the selector.

17 Claims, 4 Drawing Sheets

IMAGE PROCESSING APPARATUS

This application is a continuation of application Ser. No. 900,998, filed Aug. 27, 1986, now abandoned.

BACKGROUND OF THE INVENTION

1. Field of the Invention

The present invention relates to an image processing apparatus such as a laser beam printer.

2. Related Background Art

Digital image signals have been frequently used in recent years due to easy processing and transmission. Dither methods and density pattern methods have been proposed to digitize gray scale signals of a halftone image in conventional image processing apparatuses. Using these methods, however, sufficient gradation precision cannot be obtained if a small threshold matrix is used. In order to solve this problem, a large matrix must be used. In this case, however, it is impossible to reproduce images of high quality since image resolution is degraded and a texture structure stands out due to the matrix periodic structure.

A PWM (Pulse Width Modulation) system has been proposed to output a halftone image of high quality and a character or line image of high quality. In this system, an analog (gray scale) video signal is compared with, e.g., triangular pulses synchronized with the video signal to binarize the video signal. According to this scheme, if the binarized video signal after PWM modulation is not accurately transmitted to a laser generation apparatus, a halftone image cannot be reproduced with high quality.

FIG. 2 shows a conventional case wherein inaccurate transmission of the binary signal to the laser generation apparatus is caused by a horizontal sync signal generator circuit. More specifically, if a detection signal is obtained upon radiation of a laser beam onto a beam detector 5, beam pattern data applied to the beam detector 5 is preferably $FF_{(H)}$ (where H is the hexadecimal notation). On the other hand, if digital data is binarized by a binarizing circuit 1 and the resultant binary signal is input to, e.g., a semiconductor laser 4, an insertion circuit 3 (i.e., an OR gate in this example) (intervention means) is required to insert the beam pattern data $FF_{(H)}$ in the binary data. When a special circuit, such as the insertion circuit 3 is additionally arranged, circuit parameters of the insertion circuit 3 particularly influence PWM short pulses to slightly change the ON/OFF timings the pulses in the PWM binarizing operation by the binarizing circuit 1. In this case, the image tends not to be accurately reproduced. This problem occurs in not only the PWM binarizing operation but also in the dither binarizing operation.

SUMMARY OF THE INVENTION

It is an object of the present invention to provide an image processing apparatus which eliminates the conventional drawbacks described above.

It is another object of the present invention to provide a beam printing apparatus capable of accurately reproducing an image.

It is still another object of the present invention to provide an image printing apparatus capable of recording a halftone image with high quality.

It is still another object of the present invention to provide an improvement in an apparatus for recording an image with a laser beam.

It is still another object of the present invention to provide an improvement in an apparatus for reproducing an image by pulse width modulation.

The above and other objects, features, and advantages of the present invention will be apparent from the following detailed description in conjunction with the accompanying drawings.

DETAILED DESCRIPTION OF THE PREFERRED EMBODIMENT

Figure 1:
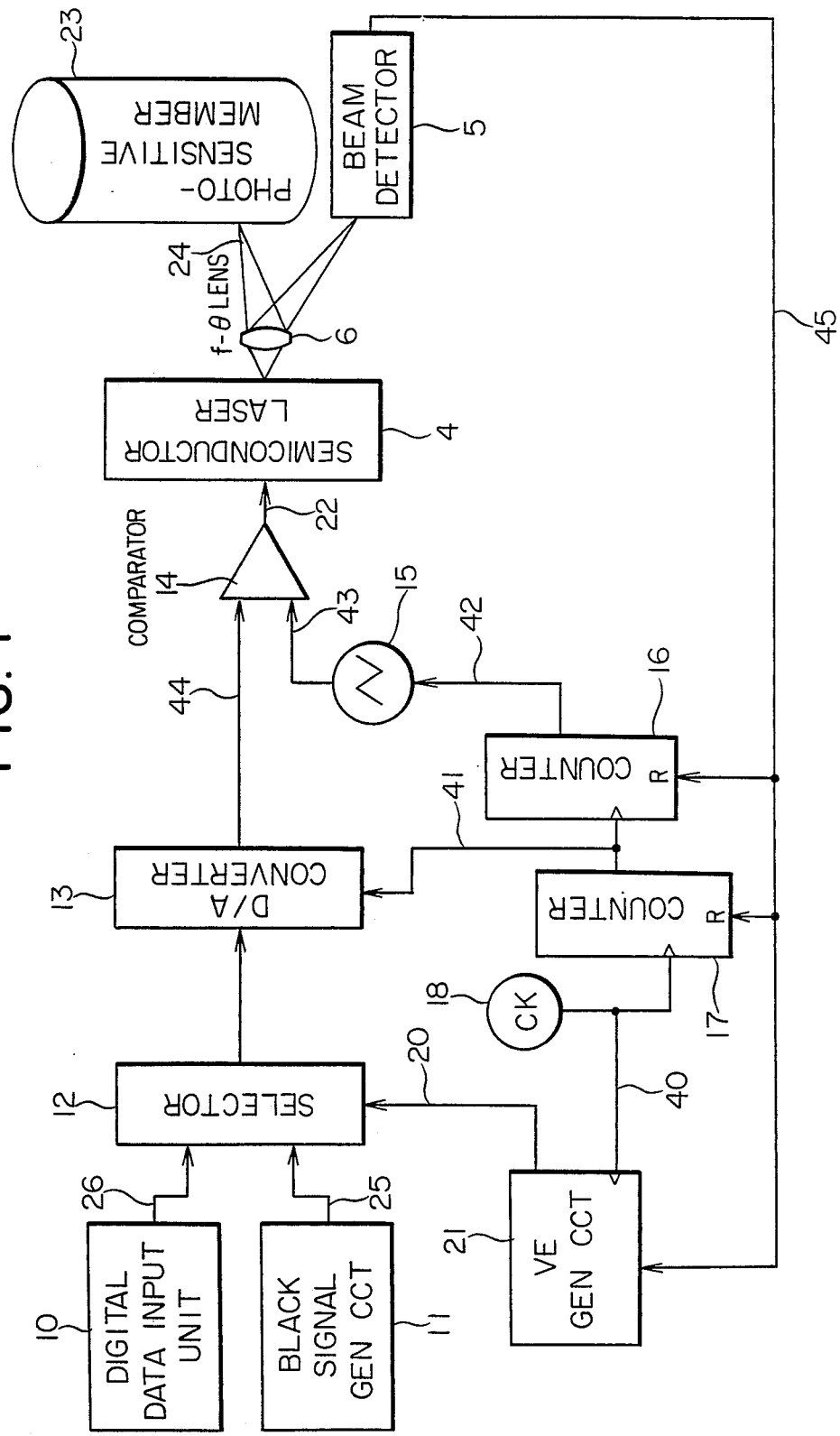
FIG. 1 is a block diagram showing an image processing apparatus according to an embodiment of the present invention.

A beam scanning apparatus according to an embodiment in FIG. 1 comprises a semiconductor laser 4, a beam detector 5, a black signal generator circuit 11, a VE (Video Enable) generator circuit 21, and a binarizing means (e.g., a selector 12, a comparator 14, a triangular wave generator circuit 15, and a D/A converter 13). The semiconductor laser 4 converts a binary signal 22 into a beam 24 and transmits the beam 24 onto a photosensitive member 23 so that the member 23 is scanned with the beam 24. The beam detector 5 detects that the beam 24 is incident at a predetermined scanning position. The black signal generator circuit 11 generates a beam pattern (if the logical value of the beam to be detected is logic "1", the pattern represents a "black" pattern) to be incident on the beam detector 5. The VE generator circuit 21 generates detection timing signals representing timings for causing the light beam to be incident on the beam detector 5 and a scanning timing signal representing tfiming at which the photosensitive member 23 is scanned with the beam. The binarizing means binarizes a black signal 25 at the detection timing and a gray scale image signal 26 at the scanning timing.

With the above arrangement, the black signal 25 as the source of the beam to be detected by the beam detector 5 is binarized after it is inserted in an image signal 26 string as valid data. As described above, the binary image data is converted to a laser beam without being influenced by the circuit parameters.

The embodiment of the present invention will be described in detail with reference to the accompanying drawings.

Figure 5:
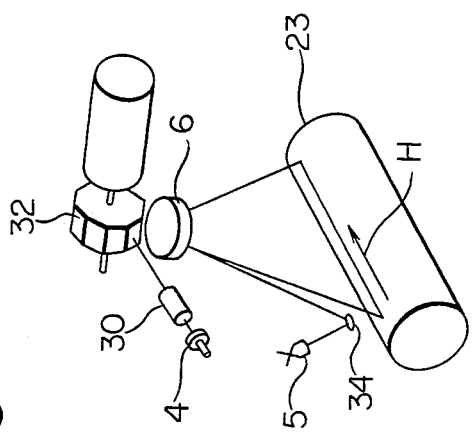
FIG. 5 is a perspective view of an arrangement for detecting the BD signal.

FIG. 1 shows an arrangement when a beam scanning apparatus is applied to a binary image processing apparatus operated by pulse width modulation. FIG. 5 is a schematic perspective view of a scanning optical system when the beam scanning apparatus is a laser beam printer.

Beam Detection

Referring to FIG. 5, a scanning optical system includes a semiconductor laser 4. The semiconductor laser 4 receives binary input data and emits a laser beam according to the input data. A beam modulated by the semiconductor laser 4 is collimated by a collimator lens 30 and is deflected by a polygonal rotating mirror 32. The deflected beam is focused by a focusing lens 6 called an f-θ lens onto a photosensitive member 23, thereby performing scanning with a laser beam. In order to perform such scanning, the leading end in one-line scanning is reflected by a mirror 34 and is guided onto a beam detector (sensor) 5. A detection signal from the beam detector 5 is used as a sync signal along a scanning direction H (i.e., the horizontal direction). The detection signal is used as a BD (Beam Detection) signal (i.e., a horizontal sync signal).

The BD signal is detected in units of scanning lines and serves as a timing signal for sending the video signal to the semiconductor laser 4.

Insertion of "Black" Signal

Referring to FIG. 1, a digital data input unit 10 receives data from a CCD sensor (not shown) or a video camera (not shown), and supplies it as A/D converted image density data to one input terminal of a selector 12. The digital data in the digital data input unit 10 may be temporarily stored in a memory or may be supplied from an external device by a transmission line or the like. The other input terminal of the selector 12 receives the "black" signal 25 from the black signal generator circuit 11. As previously described, logic "1" represents "black". The "black" signal is supplied to the semiconductor laser 4 at a timing for causing the beam detector 5 to perform detection. The VE generator circuit 21 counts master clocks 40 from a master clock generator circuit 18 in response to a horizontal sync signal (BD) 45 from the beam detector 5 to determine a valid image area on the photosensitive member 23. A signal VE 20 from the VE generator circuit 21 is used as a switching signal for the selector 12. More specifically, as shown in FIG. 4, if the signal VE 20 is set at logic "0", an output signal (i.e., the "black" signal 25) from the black signal generator circuit 11 is supplied to a D/A converter 13. However, if the signal VE 20 is set at logic "1", the digital data 26 from the digital data input unit 10 is selected. When the signal VE 20 is set at logic "0", an output $FF_{(H)}$ is generated and converted into an analog signal by the D/A converter 13. As shown in the timing chart of FIG. 3, since the analog signal has a higher level than that of any one of triangular waves 43 generated by the triangular wave generator circuit 15, an output from a comparator 14 is a laser ON signal (all "1"s).

However, when the signal VE 20 is set at logic "1", digital data 26 from the digital data input unit 10 is selected and is converted into an analog signal by the D/A converter 13. The pixels are input to the comparator 14 one by one. The triangular wave generator circuit 15 generates each triangular wave pulse 43 for every three pixels from the digital data input unit 10. The triangular wave pulse 43 is then input to the comparator 14. The master clocks 40 are counted by a counter 17 in response to the horizontal sync (BD) signal 5, so that the count of the counter 17 is sequentially decremented. The counted clocks are used as image clocks 41 consisting of transfer clocks of the digital data input unit 10 and latching timing clocks of the D/A converter 12.

The comparator 14 compares the D/A converted image signal (including the digital data 26 and the "black" signal 25) with the signal level of the triangular wave pulse 43 to PWM-modulate the gray level of the image signal.

Binarizing Processing

Figure 3:
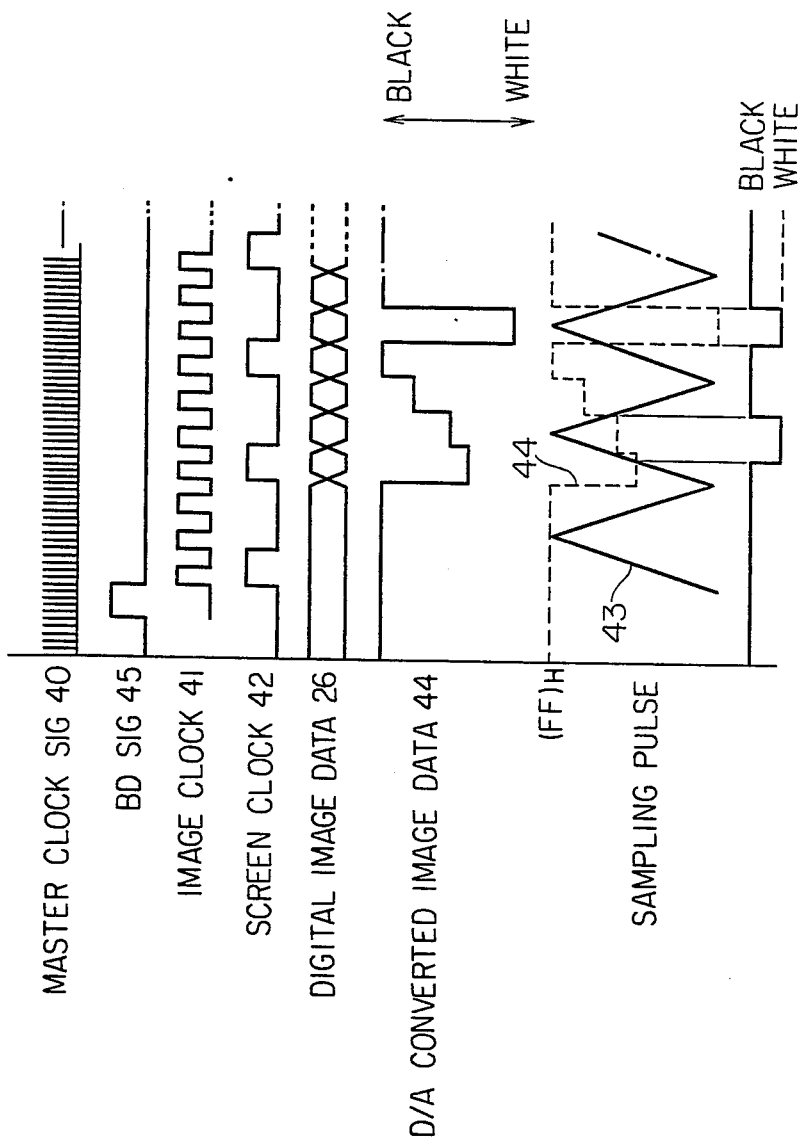
FIG. 3 is a timing chart showing the relationship between a signal VE and a signal input to a D/A converter.
Figure 4:
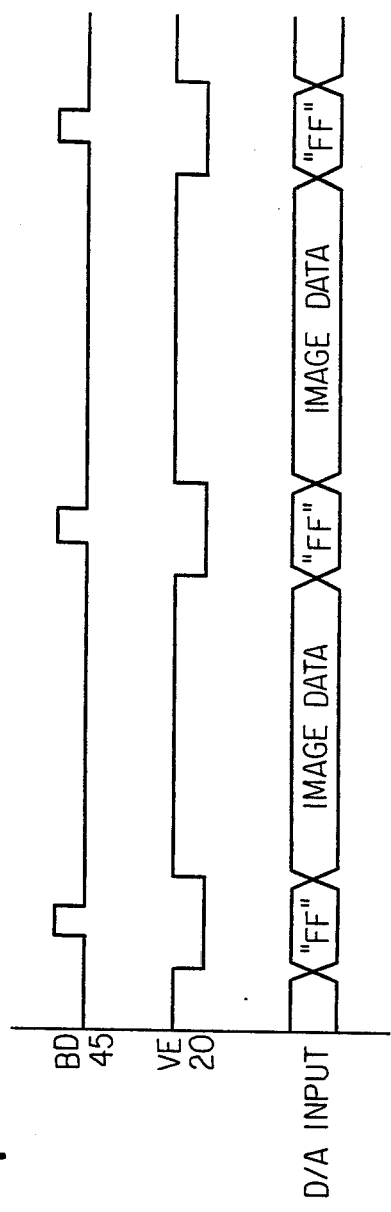
FIG. 4 is a timing chart for explaining the effect of the embodiment in FIG. 1.

FIG. 3 is a timing chart for explaining pulse width modulation used in the embodiment of FIG. 1. A screen clock 42 is obtained by counting down the image clocks 41 by means of a counter 16. One screen clock is generated for every three image clocks 41. The triangular wave generator circuit 15 generates the triangular wave 43 in response to the screen clock 42. Therefore, the triangular wave is generated in response to a BD signal 45. The D/A converted image data 44 represents "black" if it has a higher level. The triangular waves 43 are represented by the solid line in the timing chart. The dotted line represents the analog image data 44. The triangular waves 43 are compared with the image data 44 to perform pulse width modulation. If the black signal 25 (i.e., $FF_{(H)}$) is input, it has a higher level than that of the sampling pulse, thus representing "black".

FIG. 4 is a timing chart showing the relationship between the BD signal 45 and the D/A converter 13 or the like. Upon generation of the BD signal 45 from the beam detector 5, the BD signal 45 biases the VE generator circuit 21 to set the signal VE 20 at logic "1" for the valid period of the image data. The start and end of this period are determined by counting a predetermined number of master clocks 40. After the lapse of this period, the signal VE 20 is disabled to logic "0" to cause the selector 12 to select the "black" signal. The signal VE 20 is enabled to logic "1" in response to the next BD signal 45. The signal input to the D/A converter 13 is shown in FIG. 4. As a result, the "black" signal 25 ($FF_{(H)}$) is inserted in the image data.

Figure 2:
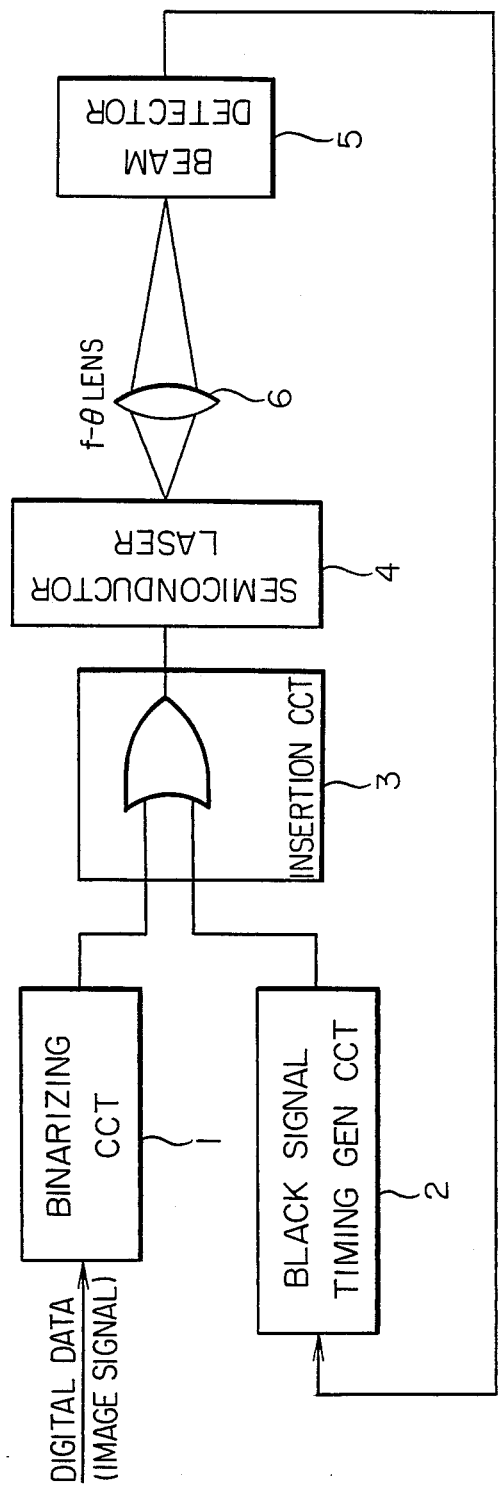
FIG. 2 is a block diagram showing a circut for detecting a BD (Beam Detection) signal.

According to the embodiment described above, the laser all ON signal is inserted in the nonimage valid portion of the video signal string in a circuit in front of the PWM binarizing circuit. Since the special all ON signal is supplied to the laser, the insertion circuit 3 (FIG. 2) can be omitted, thereby relatively simplifying hardware. The PWM signal obtained by comparison with the triangular pulses 43 is directly supplied to the laser without going through the special circuit as previously mentioned. The pulse width of the PWM signal does not vary by the delay time of the special circuit at the side of the laser (such variations poses a problem especially at a high speed). Therefore, the pulse signal, accurately matched with the image signal, can be transmitted, and a halftone image of high quality can be obtained.

In particular the master clocks 40 having a frequency higher than that of the sync signal for generating triangular waves are used to obtain the screen clocks substantially synchronized with the BD signal 45. Therefore, "blurring" which tends to occur in units of scanning lines can be minimized, thereby obtaining an image of higher quality.

In the above embodiment, triangular waves are used as sampling pulses input to the comparator 14. However, the sampling pulse may be a saw-tooth wave pulse, a trapezoidal wave pulse, a sinusoidal wave pulse, or the like. In addition, the sampling pulses may be constituted by a stepwise signal.

Pulse width modulation in the above embodiment is performed by comparing pattern signals of a plurality of pixels. However, the present invention may be applicable to pulse width modulation wherein one pixel is processed to obtain multiple values or divided in the main scanning direction so as to obtain multivalue data according to the gray scale levels of the image signals. In addition, the present invention may also be applied to a binarizing scheme by area modulation such as a dither method, in addition to the PWM binarizing scheme.

According to another arrangement, a special pattern signal is generated to cause another selector to select the pattern signal or an image signal from the image input unit 10 at a desired timing to selectively output a binary signal. An image corresponding to the input image signal can be reproduced with good halftone characteristics. At the same time, an image corresponding to the special pattern image (i.e., a matrix pattern or a character, such as a date) may be added to the input image so that they may be recorded together.

Furthermore, if liquid crystal elements or LED's are used to constitute a line sensor along the width of the photosensitive member 23, and an image is printed with good halftone characteristics according to the above-mentioned pulse width modulation, the specific pattern signal is added at a circuit stage as described above, thereby maintaining good halftone characteristics with high precision.

What is claimed is:

1. An image processing apparatus comprising: pulse width modulating means for receiving an image signal and processing the image signal to form a pulse width modulation signal;
   means for performing optical modulation in response to the pulse width modulated signal from said pulse with modulating means;
   means for generating a predetermined pattern signal; and
   means for supplying the predetermined pattern signal to said pulse width modulating means so as to form a predetermined pulse width modulated signal independently of the image signal,
   wherein said pulse width modulating means independently processes either the received image signal or the predetermined pattern signal to form a pulse width modulated signal.

2. An image processing apparatus comprising:
   means for receiving an image signal and binarizing the received image signal;
   means for generating a beam on the basis of a binary signal from said binarizing means;
   means for generating a predetermined signal so as to generate a beam representing a predetermined density; and
   means for selectively supplying either the image signal or the predetermined signal to said binarizing means,
   wherein said binarizing means binarizes either the received image signal or the predetermined signal to produce a binary signal.

3. An apparatus according to claim 1, wherein said performing means comprises means for generating a beam in response to the pulse width modulated signal, said apparatus further comprises means for scanning the beam and means for detecting a scan position of the beam to produce a sync signal,
   wherein said supply means supplies the predetermined pattern signal to said pulse width modulating means so that said detecting means can detect the beam.

4. An apparatus according to claim 3, further comprising means for generating a clock signal, wherein said supply means is adapted to count the clock signal in response to the sync signal and determine a timing for supplying the image signal and the predetermined pattern signal to said pulse width modulating means.

5. An apparatus according to claim 3, wherein said pulse width modulating means comprises means for digital-to-analog converting the image signal or the predetermined pattern signal to produce an analog density signal, means for generating an analog pattern signal in response to the sync signal, and means for comparing the analog density signal from said digital-to-analog converting means with the analog pattern signal to produce a pulse width modulated signal.

6. An apparatus according to claim 5, wherein said analog pattern signal is a triangular wave signal.

7. An apparatus according to claim 5, further comprising means for forming a transfer clock employed to transfer the image signal, in response to the sync signal.

8. An apparatus according to claim 2, further comprising means for scanning the beam and means for detecting a scan position of said beam to produce a sync signal, wherein said supply means supplies the predetermined signal to said binarizing means so that said detecting means can detect the beam.

9. An apparatus according to claim 8, further comprising means for generating a clock signal, wherein said supply means is adapted to count the clock signal in response to the sync signal and determine a timing for supplying the image signal and the predetermined signal to said binarizing means.

10. An apparatus according to claim 8, wherein said binarizing means comprises means for digital-to-analog converting either the image signal or the predetermined signal to produce an analog density signal, means for generating an analog pattern signal in response to the sync signal, and means for comparing the analog density signal from said digital-to-analog converting means with the analog pattern signal to produce a pulse width modulated binary signal.

11. An apparatus according to claim 10, wherein said analog pattern signal is a triangular wave signal.

12. An image processing apparatus comprising:
    means for receiving an image signal and multi-level processing the received image signal;
    means for forming an image in response to a gray-scale signal from said processing means;
    means for generating a pattern signal employed to form a timing signal for image formation by said forming means; and
    means for selectively supplying either the image signal or the pattern signal to said processing means,
    wherein said processing means processes the image signal or the pattern signal to produce the gray-scale signal.

13. An apparatus according to claim 12, wherein said image forming means comprises means for generating a beam in response to the gray-scale signal, means for scanning the beam and means for detecting a scan position of the beam to produce a sync signal, said sync signal corresponding to the timing signal, and wherein said supply means supplies the pattern signal to said processing means so that said detecting means can detect the beam.

14. An apparatus according to claim 13, further comprising means for generating a clock signal, wherein said supply means is adapted to count the clock signal in response to the sync signal and determine a timing for supplying the image signal and the pattern signal to said processing means.

15. An apparatus according to claim 13, wherein said processing means comprises means for digital-to-analog converting the image signal or the pattern signal to produce an analog density signal, means for generating an analog pattern signal in response to the sync signal and means for comparing the analog density signal from said digital-to-analog converting means with the analog pattern signal to produce a gray-scale signal.

16. An apparatus according to claim 15, wherein said analog pattern signal is a triangular wave signal.

17. An apparatus according to claim 15, further comprising means for forming a transfer clock employed to transfer the image signal, in response to the sync signal.

* * * * *